Nov. 14, 1972     W. T. HIGGINS     3,702,690
WINCH LAUNCH SYSTEM
Filed Dec. 7, 1970     3 Sheets-Sheet 1
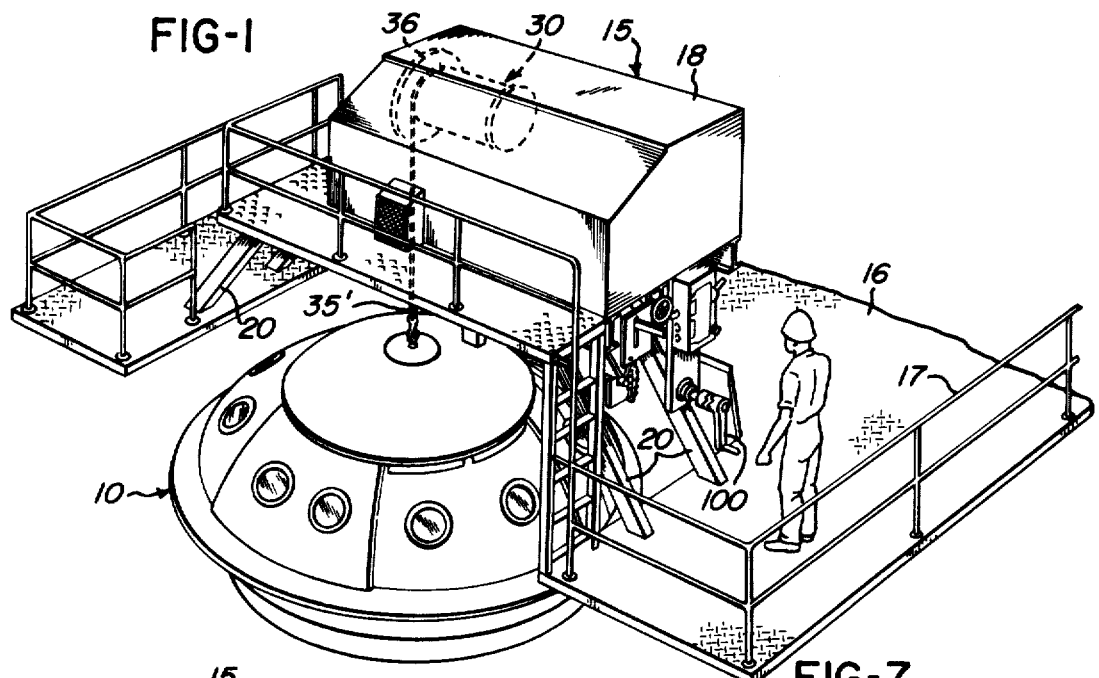
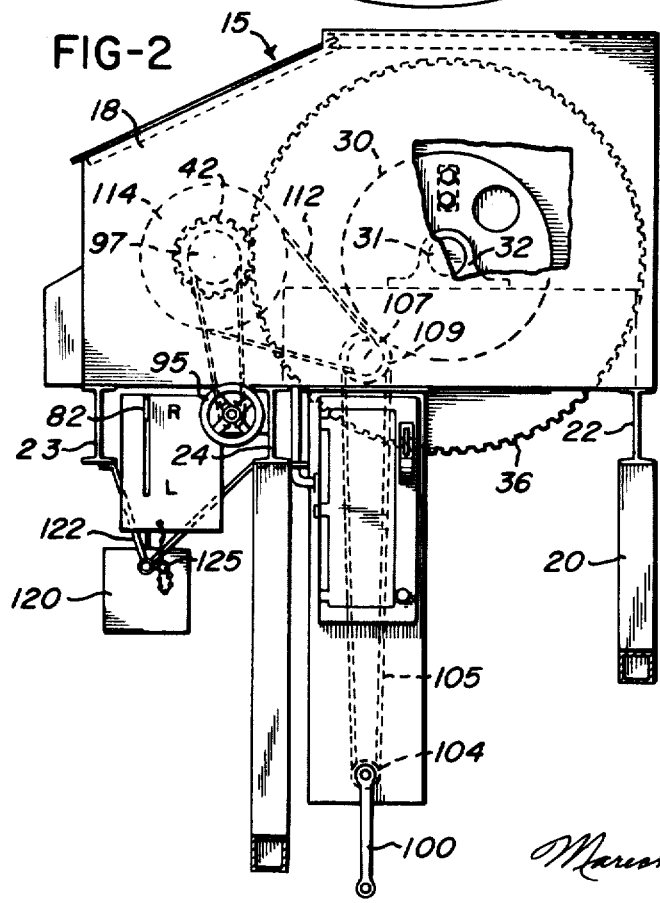
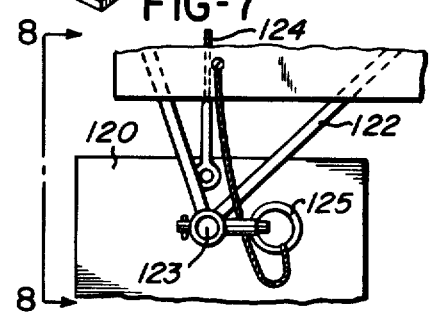
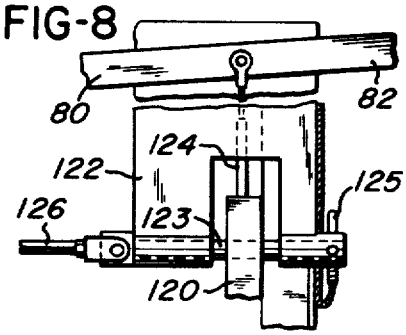
INVENTOR
WILLIAM T. HIGGINS
BY Marshal, Biebel, French & Bugg
ATTORNEYS

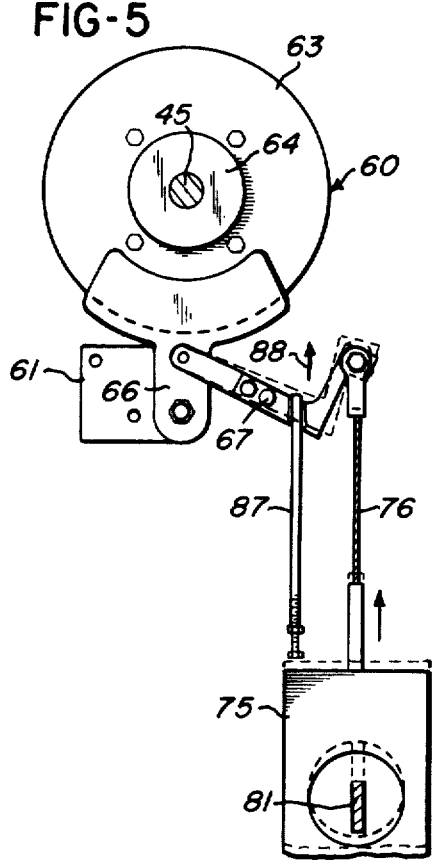
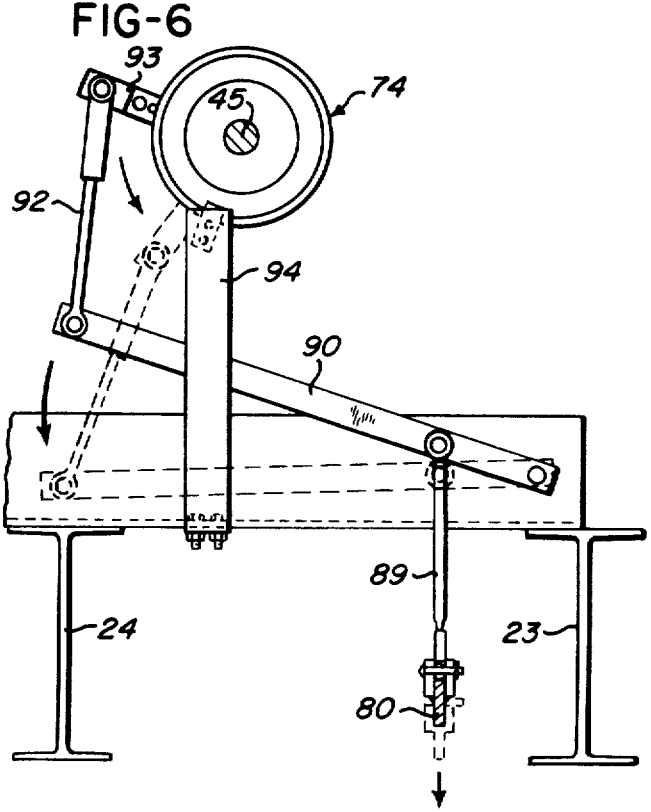
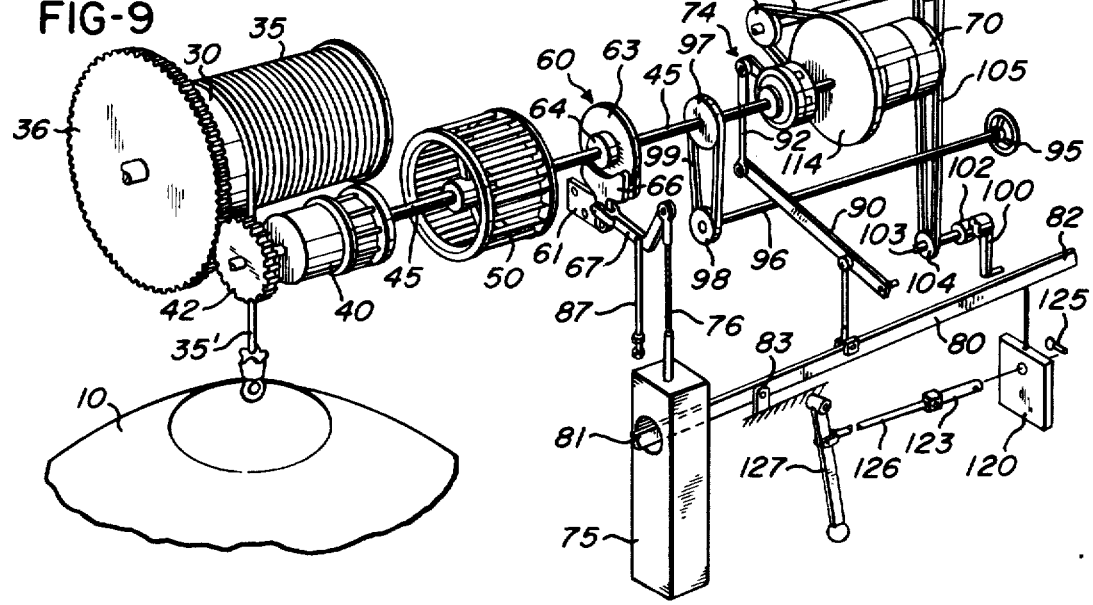

United States Patent Office 3,702,690
Patented Nov. 14, 1972

3,702,690
WINCH LAUNCH SYSTEM
William T. Higgins, Springfield, Ohio, assignor to Kelsey-Hayes Company, Springfield, Ohio
Filed Dec. 7, 1970, Ser. No. 95,430
Int. Cl. B66d 1/00
U.S. Cl. 254—187          2 Claims

ABSTRACT OF THE DISCLOSURE

A launching system is disclosed useful for raising and lowering life support capsules and the like from off-shore drilling rigs, in which the capsule is lowered by a winch at a controlled rate as regulated by a centrifugal blower operated through speed-up gearing. A disk brake on the blower shaft holds the life support capsule in any given position. Provision is included for releasing the brake at a remote point, such as within the capsule, to provide for an unpowered and controlled descent. The brake is connected through a one-way clutch so that the capsule may be raised by the rotation of the winch while the brake is on to prevent accidental descent of the capsule. An electric motor is provided for raising the capsule by the winch, and is isolated by means of a clutch which works on an operator common with that of the brake to assure that the motor is de-clutched prior to releasing the brake, in a lowering operation. Provision is included for raising the capsule by hand, and also for manually retrieving and paying out the cable when the capsule is not attached.

BACKGROUND OF THE INVENTION

Launching systems for life support capsules are required to be both rugged and yet simple and reliable in operation. It is important that they be capable of lowering a life support capsule into the sea off of a derrick or off-shore oil rig without the necessity of human attention on rig. Since the capsules have a considerable weight, it is important that the descent of the capsule to the surface of the water be controlled. Since such system is designed for use primarily in emergency conditions, it is important that it function smoothly and properly with a minimum of attention.

Capsule launch systems have been made which utilize a combination of hydraulic cylinders and movable sheaves. While such systems are generally satisfactory, they are characterized by high cost. Hydraulic cylinder rods are subject to corrosion and high maintenance and repair costs. Also changes in temperature have a greater affect on lowering rate due to changes in hydraulic fluid viscosity. Further, since the hydraulic fluid used to operate the system is inflammable, and the hoses and other connections are subject to damage, the hydraulic system may be rendered useless in the event of a fire or extreme heat. Winches with centrifugal brake energy absorbers have been used in launch systems but experience problems with heat dissipation and wear at brake surfaces when subjected to relatively high loadings and large descent heights.

The present invention is therefore directed to an all-mechanical life support capsule launching and recovery system which utilizes a rugged drum-type winch for raising and lowering the capsule. The system is maintained in instant readiness for a launch, and the capsule is launched without any use of auxiliary power but by its own weight and at an accurately controlled descent speed. The rate at which the cable is payed off of the winch is controlled by a centrifugal blower operated through a speed-up gearing system. The centrifugal blower is in effect a self-limiting device as regards input power since the power required to operate a blower varies according to the cube of the blower speed. The capsule descent rate is held fairly constant over a wide range of capsule loadings. The blower provides an effective speed control device by which the descent rate of the capsule may be maintained at or below a safe maximum rate.

The capsule is retained in its condition of readiness in a raised position by a brake which is normally applied by a weight. When it is desired to lower the capsule, the brake is released by lifting the weight. This may be done either manually, as in the case of drills, or may be done remotely from within the capsule itself. In the latter case, a safety device is removed by a person within the capsule which applies a secondary weight to a lever overriding the effect of the brake applying weight, thus releasing the brake and initiating the controlled descent.

The lifting of the capsule is accomplished by an electric motor which is connected to a shaft in common with the blower, through a releasable clutch. The purpose of the clutch is to disconnect the motor during descent so the motor will not be damaged due to the higher speed of shaft rotation during lowering. The motor disconnect clutch is operated by the same lever which operates the primary brake to assure that the clutch and the hand crank systems are always disconnected prior to release of the brake.

Further, the brake itself preferably incorporates a one-way clutch. This is accomplished by employing a disk-type brake in which the disk is connected to the shaft through an over-running or one-way clutch. The purpose of the one-way clutch is to permit the capsule to be raised while the brake is in the energized or "on" condition, thereby preventing an accidental descent of the capsule if the electric lift drive is lost.

Provision is further included for raising and lowering the cable by hand, such as for paying out additional cable to connect to the capsule in the event the tide has gone out since the capsule was first lowered. For this purpose, a hand wheel is provided by means of which the winch drum may be rotated to raise or lower the cable. Also, hand crank means are provided through which the cable and attached capsule may be raised by hand. The crank is spring loaded with beveled cog teeth to safeguard against backdriving or whipping when the motor is running. This has particular advantage where it is desired to raise the capsule by hand rather than by the electric motor drive into its final position so as to prevent possible damage to the capsule or to the equipment.

It is accordingly an important object of this invention to provide a winch system for raising and lowering life support capsules from off-shore drilling rigs and the like.

Another important object of the invention is the provision of an improved drive and control system for a winch in which a centrifugal blower is connected to be driven by the winch so as to control the rate of descent of the capsule from the rig.

Another object of the invention is the provision of a brake for retaining a life support capsule in a raised position, together with a remote brake release which is operable from within the capsule so that anyone on board can release the brake and initiate a controlled descent.

A further object of the invention is the provision of a capsule lowering and retrieval winch in which a brake is incorporated for holding the capsule in any given position and in which the raising of the capsule is provided through an overrunning clutch with the brake engaged so that loss of power during raising will not result in descent of the capsule.

Another object of the invention is the provision of a winch system for raising and lowering the life support capsule, as outlined above, by which manual drives are provided by which the cable can be payed out in order to engage the capsule and further by which the capsule can be raised to a final position while observing the position of the capsule.

These and other objects and advantages of the invention will be apparent from the following description, the accompanying drawings and the appended claims.

BRIEF DESCRIPTION OF THE DRAWINGS

FIG. 1 is a perspective view of a survival capsule launching system according to this invention;

FIG. 2 is an end elevation of the control panel side of the winch system;

FIG. 5 is an enlarged diagram showing the brake operating weight looking generally along the line 5—5 of FIG. 3;

FIG. 6 is a view showing the clutch and the clutch-operating mechanism looking generally along the line 6—6 of FIG. 3;

FIG. 7 is a fragmentary enlarged end view of the lower left-hand portion of FIG. 2 showing the over-balance weight and safety pin retainer;

FIG. 8 is a side view of the brake over-balance weight retainer looking generally along the lines 8—8 of FIG. 7; and FIG. 9 is a perspective diagrammatic view of the drive and control mechanism of this invention.

DESCRIPTION OF THE PREFERRED EMBODIMENT

Figure 3:
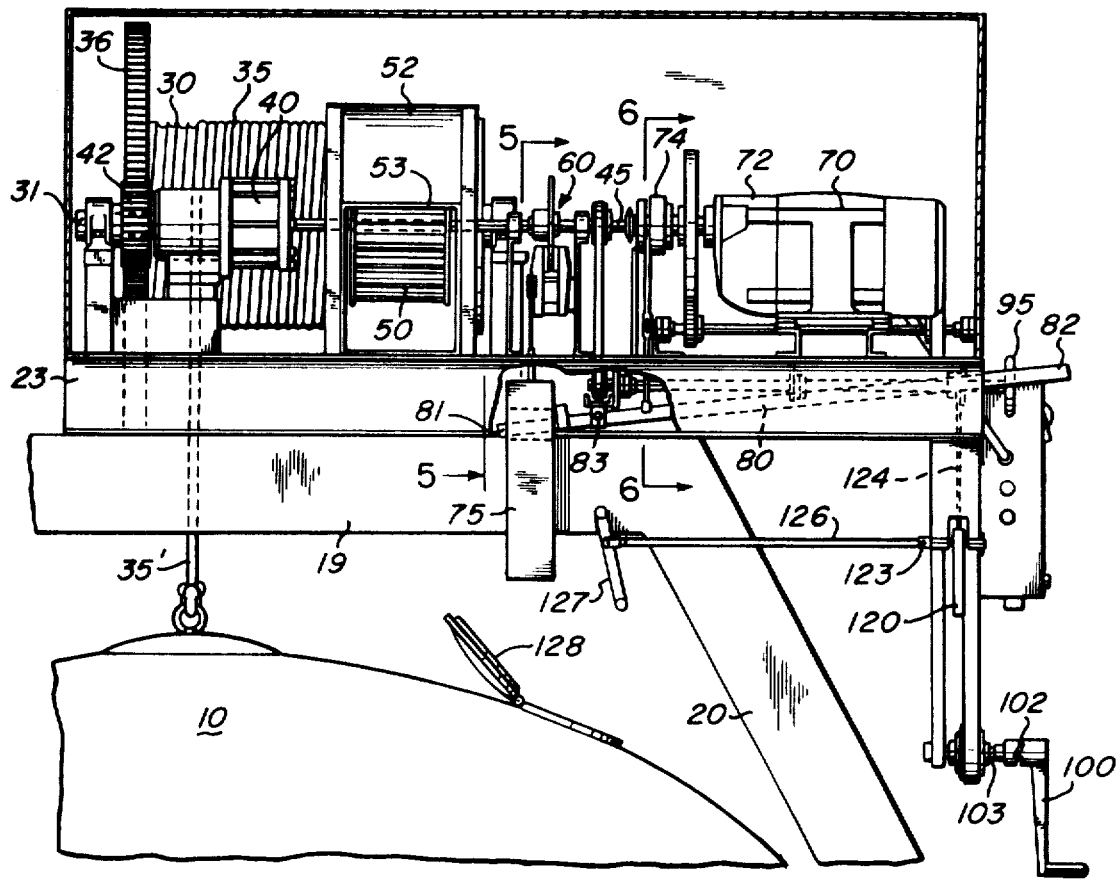
FIG. 3 is a side elevation of the system, with the protective hood being shown in section.

Referring to FIG. 1, a typical support capsule 10 is controlled by the winch system of this invention. This capsule is of the type used at sea on drilling rigs and on other non-floating platforms, and contains sufficient life support systems to permit an entire crew to escape off of a rig in times of danger, such as upon the occurrence of a fire or explosion. A typical such capsule provides food, water and living space for 28 passengers and has a gross weight of 11,000 pounds. It is accordingly important that a launch system be provided in which the capsule may be automatically lowered to the surface of the water without any attention by anyone on the rig. This invention provides winch means for raising and lowering the capsule during normal drills and during normal operation, and for automatically lowering the capsule onto the water in case of an emergency without the attention of any person outside of the capsule. To this end, a winch system indicated generally at 15 is supported on the structure which includes the usual catwalk 16 and railing 17. The winch system 15 is covered by a hood 18. The capsule 10 may be suspended directly from the winch structure 15 as shown in FIG. 1, or it may be suspended from a boom.

Figure 4:
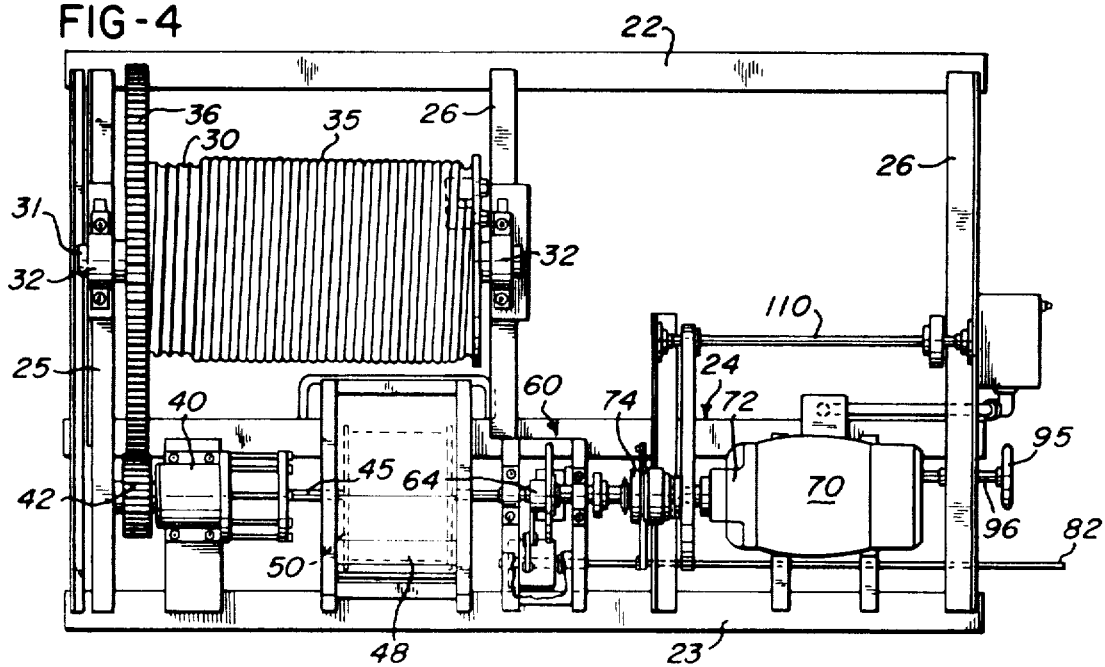
FIG. 4 is a top plan view of the winch system with the hood removed.

For the overall details of the winch system 15, reference may be had to FIGS. 2–4 in which the system 15 is shown as being mounted on a support 19 having downwardly angled legs 20. The winch system 15 is formed with a base consisting of side I-beams 22 and 23 and a center I-beam 24, connected by end cross-beams 25 and 26. The center cross-beam 24 is connected centrally to the side I-beam 22 by a center cross member 26. A winch drum 30 has a shaft 31 which is rotatably mounted on the cross-beams 25 and 26 by pillow blocks 32. A wire cable 35 is wound on the drum 30 and has a free end 35' for releasable attachment to the capsule 10. In use, the cable 35 extends downwardly from the drum 30 through a space between the cross members 22 and 24, although it may be threaded over a pulley on a boom, if this arrangement is preferred.

The invention includes an improved drive and control system for the winch drum 30. The drum is driven by a large bull gear 36. A planetary speed reducer (or speed-up) 40 is connected to the drum gear 36 by a spur gear 42. The planetary gearing 40 is adapted to be driven in either direction, that is by an input drive shaft 45 or by the spur gear 42, and when it is driven by the spur gear 42 it acts as a speed-up device.

Speed control means for controlling the rate of descent of the capsule 10 includes a blower and housing illustrated generally at 48. The blower 48 has a centrifugal blower wheel 50 received within a shroud 52. The blower wheel 50 is connected directly to the shaft 45 and turns with this shaft. For example, the bull and spur gears may have a gear ratio of approximately 6:1 and the planetary speed-up gear box 40 may have a gear ratio of approximately 15:1. This provides a rate of descent at a gross weight of 11,000 pounds of 135 feet per minute with the blower operating between 1900–1950 r.p.m. and dissipating 45 H.P. The blower has forwardly curved blades, which allows it to be reverse driven during ascent with very little power loss.

Use of the centrifugal blower has particular advantage in controlling the rate of descent of the capsule 10. Preferably, the blower wheel 50 is provided with forwardly curved blades which provide a blower which follows the cube law in that the horsepower required to provide a further increase in the r.p.m. of the blower varies accordingly to the cube of the ratio in the increase r.p.m. to that of the initial r.p.m. Therefore, the blower provides a simple, reliable and self-limiting braking system producing a relatively constant descent rate over a wide range of capsule loadings. The air is brought in through the sides of the housing 52 and discharged through the outlet 53. The energy which is dissipated is converted into kinetic energy. Thus, the descent is accomplished without the generation of excessive heat and it is further accomplished totally without the use of electrical or auxiliary power of any form.

The invention further includes a brake which is connected to the shaft 45 to prevent the rotation of the winch and the blower unless and until the brake is released. For this purpose, a caliper type disk brake 60 is mounted on a torque arm 61. The brake 60 is preferably of the mechanical actuated type, the further details of which are shown with reference to FIG. 5. A brake disk 63 is connected through an over-running or one-way clutch 64 to the shaft 45. A brake caliper 66 supports an operator arm 67, the rotation of which acts to apply internal brake pads to the disk 63. The overrunning clutch 64 permits the shaft 45 to rotate in one direction only when the brake 60 is applied. The purpose of the clutch 64 is to permit the shaft 45 to be rotated under power in such a direction as to haul up the cable 35 and raise the capsule 10 while the brake 60 is applied. If there should be a failure of the input power to the shaft 45 during the raising operation, the capsule will not be accidentally lowered.

Means for applying input power to the shaft 45 for raising the capsule by winding cable onto the drum 35 comprises an electric drive motor 70 which operates through internal speed reducing gears 72. The output of the motor 70 is applied through a controllable clutch 74 to the shaft 45. The clutch 74 may be made according to U.S. Pat. No. 3,127,969. The purpose of the clutch 74 is to disengage the motor 70 (and the hand crank described below) during descent operation. If the rotation of the shaft 45 were applied directly to the motor through the gearing 72 it would likely desrtoy the motor and the hand crank system. Accordingly, the clutch 74 is employed to assure that the drive motor 70 and the hand crank system are applied to the shaft 45 only during the raising of the capsule 10 and disengaged whenever the capsule 10 is lowered. The brake 60 is applied by a brake weight 75 connected to the end of the arm 67 by a cable 76. The weight 75 provides a convenient and reliable means by which a braking force may be normally applied to the brake 60.

A common lever 80 is used to release the clutch 74 and the brake 60. The lever 80 has one end 81 extended through an aperture formed in the weight 75 for raising the weight. The opposite end 82 extends to a side of the winch system 15 for convenient manipulation by an operator. The lever is fulcrumed at 83 at a point intermediate its ends and adjacent the weight 75. Lowering the end 82 results in pivotal movement of the lever 80 about the pivot 83 to raise the weight 75 and release the brake. In order to assure positive release of the brake 60, a rod 87 depends from the arm 67 and is contacted by the weight 75 whenever the weight is raised by the lever 80, thus assuring positive releasing movement of the arm 67 in the direction of the arrow 88 (FIG. 5).

As stated above, the clutch 74 is also operated by the lever 80. This arrangement is shown in FIGS. 5 and 6 and assures that the clutch 74 is always disengaged prior to the raising by the lever 80 of the weight 75. The slot through which the lever end 81 passes within the weight 75 is somewhat wider than the width of the lever, so that some slack movement of the lever 80 occurs when the remote end 82 is first lowered. This slack movement is effective to release the clutch 74 by means of the mechanism diagrammatically illustrated in FIG. 6. A vertical operator link 89 has its lower end connected to the lever 80. The upper end of the link 89 is connected to a pivoted lever 90 which, in turn, connects with a connecting link 92 and a clutch arm 93. The clutch 74 is shown as being mounted on a torque arm 94. Since the connection of the clutch 74 is at the opposite side of the fulcrum 83, the opposite movement of the lever 80 is effective to disconnect the clutch, as shown by the broken lines of FIG. 6. Lever 80 is held in its raised position by a detent in the clutch 74. This allows the weight 75 to hang free with clearance between hole and lever end 81. This also necessitates the physical repositioning of the lever to brake the system.

The invention further provides means by which the cable 35 may be manually payed out, when the capsule 10 is disconnected, as may be necessary to make a new connection with the capsule. This ability to lower the cable is necessary where the invention is used in combination with life support capsules in tidal waters. For this purpose, a hand wheel 95 is mounted for rotation on a shaft 96 and is positioned for convenience adjacent the lever end 82. The remote end of the shaft 96 is connected to rotate the shaft 45 through pulleys 97 and 98, and a timing belt 99, as best shown in FIG. 9. Since the weight of the cable 35 is normally insufficient to cause it to pay out by itself due to system friction, the weight 75 can be lifted by the lever 80, and the hand wheel 96 can be rotated in either direction to retrieve or let out more cable.

The invention further includes a hand crank 100 which is effective for rotating the drum 30 with the capsule attached, for raising the capsule by hand. It is expected that the motor 70 normally will be used for this purpose, but only up to a certain point, it often being desirable to complete the final raising movement of the capsule 10 by haand rather than by the motor. For this purpose, the crank 100 is provided with a one-way rachet 102, and is mounted for rotation on a shaft 103, as shown in FIG. 9. A pulley 104 and a cogged or timing belt 105 connect the movement of the handle 100 to a pulley 109 on an idler shaft 110. The idler shaft is, in turn, connected to rotate the input side of the clutch 74 through another timing or cogged belt 112 and pulleys 113 and 114. In this manner, the hand crank 100 is placed in mechanical parallel relation with the motor 70. The rachet 102 incorporates disengage and bevel cog teeth which prevent backdriving of the crank handle during capsule raising, and the mechanical clutch 74 prevents rotational feedback during lowering.

As previously noted, the invention provides means by which the brake 60 may be remotely released and held in the released position, so that in an emergency a person on board the capsule (such as the last man on board) may effect release of the brake. For this purpose, there is provided adjacent and underlying the right-hand end frame 26 a brake over-balancing or release weight 120, the details of which are best shown in FIGS. 7 and 8. This weight is normally retained on a yoke member 122 by a removable pin 123. It is connected to the end 82 of the lever 80 by means of a slack cable 124. The pin 123 is retained in the yoke 122 by means of a safety pin 125. A bar 126 extends from the pin 123 to a pivoted hand lever 127 which may be reached through a hatch door 128 in the capsule as illustrated in FIG. 3. The weight 120 is sufficient, when applied to the lever 80 to cause the lever to lift the weight 75 and release the brake 60, and retain the brake in the released position initiating a controlled descent of the capsule 10. This is readily accomplished by removing the safety pin 125 and exerting a pull on the rod 126 extracting the pin 123 and allowing the weight 120 to drop until it picks up the slack and pulls down on the cable 124.

It is considered that the operation of the winch launching system of the present invention is largely, from the foregoing description, self-evident. In normal use, an operator is stationed on the catwalk 16 essentially as shown in FIG. 1. When it is desired to lower the capsule, he simply depresses the lever 80 thus releasing the clutch 74 and releasing the brake 60. If he desires to stop the capsule in any intermediate position, he positions the lever 80 in its raised position, and the brake 60 is sufficient to decelerate and stop further descent of the capsule. The controlled rate of descent, as described, is affected by the energy absorbing action of the blower 50 operating through the speed-up gearing 40. Accordingly, the descent is controlled and accomplished with the dissipation of very little heat, the energy being converted into the acceleration of air by the centrifugal blower. When the operator desires to raise the capsule, he energizes the motor 70 which applies a driving force to the shaft 45 through the clutch 74. The overrunning clutch 64 permits this driving force to be applied through the gearing 40 to the drum 30 while the brake 60 is applied. Limit switches shut off the motor just before the capsule reaches its final stowed position. Final lifting movement may then be accomplished by the hand crank 100.

While the invention has been described in terms of life support systems for oil rigs, it is obvious that this winch system could be used for launching life boats or capsules off of ships. Also, while weights 75 and 120 have been disclosed, it is also apparent that suitable springs may be used, as desired.

While the form of apparatus herein described constitutes a preferred embodiment of the invention, it is to be understood that the invention is not limited to this precise form of apparatus, and that changes may be made therein without departing from the scope of the invention.

What is claimed is:

1. In a winch system for raising and lowering life support capsules from off-shore drilling rigs, ships and the like, the improvement in drive and control system for a winch comprising a centrifugal blower to be rotated by such winch to control the rate of descent of such capsule, a brake connected to prevent rotation of said winch until released, a fulcrum lever connected to release said brake upon movement thereof by the application of a force to the remote end thereof, a normally suspended weight having a slack connection to said lever, and remote releasable means normally supporting said weight and being removable from the capsule to apply said weight to said fulcrum to release said brake to initiate a controlled descent.

2. The winch of claim 1 in which said brake is gravity-actuated by a further weight and in which said lever has a connection to raise said further weight upon the application of said normally suspended weight.

References Cited

UNITED STATES PATENTS

| | | | |
|---|---|---|---|
| 2,448,855 | 9/1948 | Black et al. | 254—187 |
| 1,515,059 | 11/1924 | McArthur | 187—21 |
| 3,189,145 | 6/1965 | Marland et al. | 192—12 B |
| 2,217,183 | 10/1940 | Ross | 192—12 B |
| 3,220,701 | 11/1965 | Clausen et al. | 254—187 |
| 2,363,821 | 11/1944 | Webster | 188—290 |
| 143,518 | 10/1873 | Massey | 187—68 |
| 3,352,384 | 11/1967 | Stevens | 192—12 B |

HARVEY C. HORNSBY, Primary Examiner

MERLE F. MAFFEL, Assistant Examiner

U.S. Cl. X.R.

192—12 B